United States Patent Office 3,642,686
Patented Feb. 15, 1972

3,642,686
PIGMENT PREPARATIONS
Guenther Zwahlen, Dornach, Ernst Reich, Bettingen, and Albert Riegler, Basel, Switzerland, assignors to Ciba Limited, Basel, Switzerland
No Drawing. Filed Dec. 20, 1968, Ser. No. 785,769
Claims priority, application Switzerland, Jan. 4, 1968, 80/68
Int. Cl. C08g 51/04, 51/14; C08b 21/04
U.S. Cl. 260—37                    3 Claims

ABSTRACT OF THE DISCLOSURE

Preparations containing a pigment and/or an optical brightener and a polyterpene resin are useful for pigmenting high molecular weight organic materials, especially thermoplastics, lacquers, printing inks and spinning melts or solutions.

---

Pigments are advantageously employed for the colouration of various substrata in order to prevent subsequent migration or bleeding-out of the colouring matter. Such colouring matters or dyestuffs are not only insoluble or for practical purposes insoluble in water but also in various organic solvents. In practice, however, difficulties are frequently encountered in the distribution of the pigment powder in a finely divided state and uniformly in the substratum in question. In order to overcome these difficulties recourse is frequently made to pigment preparations in which a pigment is distributed in a concentrated form in a suitable carrier. Various requirements are of course necessary for such a pigment preparation to be able to fulfill its purpose. Thus the pigment must already be uniformly distributed in the preparation, and the carrier must be suitable for the end use envisaged, that is to say it must be compatible with the substratum which is ultimately to be coloured and must be capable of easy incorporation therein.

This invention is based on the unexpected observation that preparations containing a pigment and/or an optical brightener having pigment characteristics and a polyterpene resin and if desired at most 10% of a low molecular weight olefine polymer calculated on the weight of the polyterpene resin, are outstandingly suitable for the pigmentation of high molecular weight organic compounds.

Suitable pigments for the preparations according to the invention are for example inorganic pigments for example carbon black, metal powders, titanium dioxide, hydrated iron oxides and ultramarine, but especially organic pigments for example those of the azo, anthraquinone, phthalocyanine, nitro, perinone, perylene-tetracarboxylic acid diimide, dioxazine, thioindigo or quinacridone dyestuff series, as well as optical brighteners having pigment characteristics. Mixtures of different pigments or mixtures of pigments with optical brighteners may also be used.

The polyterpene resins to be used in accordance with the invention are to be understood to be the polymers of α-pinene or preferably β-pinene as well as modified polyterpene resins for example the so-called terpene-phenol resins which are obtained by addition of phenol to terpene hydrocarbons or for example copolymers of pinene and vinyl monomers. Polyterpene resins in various melting ranges are known. Further details are found in "Kirk-Othmer," Encyclopaedia of Chemical Technology, volume 13, page 700 (1954) and in "Wagner and Sarx," Lackkunstharze (Synthetic Resins for Paints), 4th edition, page 57.

The quantity ratio of pigment to polyterpene resin may vary within wide limits but is preferably between 9:1 and 1:4. Preparations in which the proportion of pigment is 30 to 60% are particularly advantageous.

Apart from the components to be used according to the invention the preparations may further contain other auxiliary substances for example plasticisers, stabilisers or fillers, for example up to 10% of low molecular weight olefine polymers based on the weight of the polyterpene resin.

As a rule however such additives are superfluous and can in certain cases, for example when pigmenting high-melting thermoplastic compositions for example linear polyesters or polyamides, have a disadvantageous effect.

The pigment preparations may be manufactured for example by intimately mixing the components, for example by grinding in the presence of a liquid, advantageously a water-soluble organic solvent for example methanol, ethanol, iso-propanol or acetone.

Ordinary ball mills or roller mills can be used as desired. It is however advantageous to employ mills in which a charge of glass balls, porcelain balls or similar balls or a charge of hard flintstones and the like is agitated by a suitable stirrer. Such embodiments of comminution devices have a common feature in that the grinding agents are relatively freely mobile and can execute both grinding and impact movements.

After completion of the grinding process the solvent is advantageously removed by evaporation or, if a solvent has been chosen in which the polyterpene resin employed is soluble, by distributing the solvent onto a precipitating agent, whereupon the dissolved resin is precipitated onto the pigment and the preparation subsequently isolated by filtration, washing and drying.

In particular, the preparations according to the invention can be advantageously manufactured in a kneader. Working preferably takes place at elevated temperature in the presence of a grinding agent, advantageously an inorganic salt for example sodium chloride, potassium chloride, sodium sulphate or barium chloride. These salts can be afterwards washed out with water in a simple manner. Furthermore it is advisable to add an organic solvent, preferably an organic solvent which is miscible with water for example ethylene glycol, glycerine, glycol monoethyl ether, methyl ethyl ketone or diacetone-alcohol. After conclusion of the kneading process the kneaded mass is conveniently freed from salts and solvents by treatment with water. In many cases it is advantageous to use aqueous pigment dispersions as starting materials instead of the pure pigments. According to this so-called flush process it is advantageous to start from a melt of the polyterpene resin. During the flush process the pigment particles migrate into the resin and the water is separated.

If desired, the resulting pigment preparations can be comminuted according to the usual methods, for example in a grinding device.

As a result of the good compatibility of the polyterpene resins with many substances to be coloured, the pigment preparations according to the invention are useful for the pigmentation of a wide variety of high molecular weight organic materials. Depending on the choice of the type of polyterpene resin, the following may be mentioned as examples: thermoplastics for example polyvinyl chloride, vinyl chloride-vinyl acetate copolymers, polyolefines for example polyethylene or polypropylene, polystyrene and also polyacrylonitrile, polymethyl methacrylate, acrylonitrile-butadiene-styrene copolymers, natural and synthetic rubber, polyurethanes, linear polyesters and polyamides as well as cellulose esters. As examples of lacquers and paints the following may be mentioned: air-drying and heat-curing acrylic resin lacquers, air-drying alkyd resin lacquers, heat-curing alkyd-melamine resin lacquers as well as nitro combination lacquers. The preparations according to the invention are also outstandingly suitable for the manufacture of printing inks, for example alcoholic printing inks based on ethylcellulose or printing inks based on petrole and calcium resinates, chlorinated rubber printing inks, nitrocellulose printing inks based on alcohols and/or esters, polyamide resin or vinyl resin printing inks and the like.

The pigment preparations according to the invention are also suitable for the pigmentation of synthetic fibres and indeed both for melt-spun fibres and solution-spun fibres. As examples of melt-spun fibres the following may be mentioned: polypropylene, polyamide and polyester fibres and as examples of solution-spun fibres: cellulose acetate, polyacrylonitrile, PVC and polyurethane fibres.

The preparations are distinguished by excellent properties of dispersion and economy of use, uniform and pure colouring being obtained in the above-mentioned thermoplastic compositions, lacquers, printing inks, fibres and the like.

In the examples which follow the parts, unless otherwise specified, denote parts by weight and the percentages denote percentages by weight.

EXAMPLE 1

(a) 36 parts of crude β - copper - phthalocyanine, 36 parts of polyterpene resin (Croturez D, Crosby Chem. Inc.), 180 parts of ground sodium chloride and 14.5 parts of diethylcarbitol are kneaded for 6 hours in a kneader at 60 to 65° C. The kneaded composition is decomposed in the kneader by adding 50 parts of ice and isopropanol in the ratio of 4:1, and is granulated by further kneading for 30 minutes. The granular material is then subjected to wet grinding with about 3000 parts of water in a gear colloid mill to form a very fine granulate. Thereafter the material is filtered and washed with water until free from solvent and salt. The filter cake is dried in a vacuum cabinet at 70 to 80° C. A pigment preparation is obtained which yields pure and uniform blue colourations.

(b) When instead of Croturez D the polyterpene resin Nirez 1125 (Heyden-Newport) is used, a pigment preparation with similar good properties is obtained.

(c) When instead of Croturez D the polyterpene resin Escorez 4110 (Esso Standard) is employed, an equally good pigment preparation is again obtained.

EXAMPLE 2

(a) 36 parts of crude β - copper - phthalocyanine, 36 parts of a terpene-phenol resin (Nirez V 2040, Heyden Newport Chem. Corp.), 180 parts of ground sodium chloride and 18 parts of diacetone-alcohol are kneaded for 6 hours in a kneader. The kneaded mass is decomposed by adding 50 parts of water and is granulated in the kneader. The granular material is subjected to wet grinding with about 3000 parts of water in a gear colloid mill and is worked-up as in Example 1. Plastic compositions, lacquers, printing inks and fibers are coloured a uniform blue shade with the preparation thus obtained.

(b) When instead of the β-copper phthalocyanine, 36 parts of carbon black Printex 300 (Degussa) are employed, a black preparation is obtained with which lacquers, printing inks or fibres coloured a deep black are obtained.

(c) When instead of the β-copper-phthalocyanine, 36 parts of the red disazo dyestuff of formula

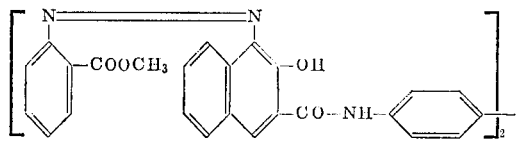

are employed, a preparation is obtained which yields strong red colourations.

EXAMPLE 3

50 parts of a modified terpene resin (Terpalyn A9, Hercules) are melted in a kneader by heating with steam. 200 parts of an aqueous filter cake containing 50 parts of polychloro-copper-phthalocyanine green are progressively introduced into the melt and flushed. After removing the water which has separated the melt is further kneaded until it is dry and until the desired degree of fine distribution of the pigment has been obtained, and is subsequently allowed to solidify by cooling. The solidified melt is powdered. The preparation thus obtained is suitable for the pigmentation of lacquers, printing inks, spun fibers, plastics and the like in the same manner as the preparations of Examples 1 and 2.

EXAMPLE 4

98 parts of polyamide made from ε-caprolactam (polyamide-6) in the form of chips are powder-coated with 2 parts of the pigment preparation obtained according to Example 2(a). The powder-coated chips are spun at 290–295° C. in an extruder. The filament thus obtained has a uniform deep blue colouration of high light and wet fastness.

When instead of the pigment preparation 2(a) the black preparation obtained according to Example 2(b) is used, fibres coloured deep black are obtained.

EXAMPLE 5 (ACRYLIC RESIN STOVING LACQUER)

5 parts of the blue preparation obtained according to Example 1(a) are stirred into 20 parts of a solvent of the following composition: 50 parts of Solvesso 150, 15 parts of butyl acetate, 5 parts of Exkin II (levelling agent), 25 parts of methyl isobutyl ketone and 5 parts of silicone oil (1% concentration in Solvesso 150).

When a fine dispersion has been obtained (about 15 to 60 minutes depending on the stirrer) the following binders are added: 48.3 parts of Baycryl L 530 (51% concentration in xylene/butanol, 3:1) and 23.7 parts of Maprenal TTX (55% concentration in butanol).

After brief homogenisation the lacquer is applied according to the usual methods and stoved (stoving for 1 hour at 110° C.). The lacquerings obtained are distinguished by very good levelling, high gloss and excellent fine distribution of the pigment.

When instead of the preparation 1(a), 5 parts of the preparation obtained according to Example 1(b) are used, an equally good lacquer colouration is obtained.

When instead of the preparation 1(a), 5 parts of the preparation obtained according to Example 1(c) are used, an excellent lacquer colouration is again obtained.

EXAMPLE 6 (ALKYD-MELAMINE LACQUER)

8 parts of the pigment preparation obtained according to Example 1(b) are dispersed in 22 parts of a solvent mixture consisting of 10 parts of xylene, 4 parts of ethylene glycol monoethyl ether, 4 parts of acetic acid butyl ester, 2 parts of n-butanol, 1 part of levelling agent and 1 part of a 1% silicone oil solution in xylene during 35 minutes at room temperature in a gear disc stirrer running at 3000 revolutions per minute. When a fine dispersion has been obtained the following binders are added with further stirring: (a) 23.5 parts of an 80% solution of an alkyd resin based on a synthetic fatty acid in xylene (Cardura 30, Shell), (b) 25.0 parts of a 75% solution of an alkyd resin based on a low molecular weight fatty acid in xylene (Alkydal F 25, Bayer) and (c) 21.5 parts of a 75% solution of a butylated melamine resin in butanol (Cibamin M 86, Ciba). After 15 minutes stirring the lacquer is applied in the usual manner and cured for 30 minutes at 135° C. A perfectly pigmented blue lacquer is obtained.

When instead of the preparation 1(b), 8 parts of the preparation according to Example 1(c) are used, a similar lacquering is obtained.

When 8 parts of the red pigment preparation obtained according to Example 2(c) are used, a similar red lacquering is again obtained.

EXAMPLE 7 (PLASTICISED POLYVINYL CHLORIDE)

0.08 part of the preparation according to Example 3, 1.0 part of titanium dioxide rutile Kronos RN 56, 13.3 parts of polyvinyl chloride type G (Lonza) and 7.3 parts of dioctyl phthalate are mixed and milled for 5 minutes in a two-roll mill at 150° C. A uniformly green-coloured foil is obtained. A reduction in the fastness to migration owing to the polyterpene resin is not observed.

Instead of the preparation according to Example 3 the preparations according to Examples 1(a), 1(b), 1(c), 2(a), 2(b) and 2(c) can be used with equally good results.

EXAMPLE 8 (POLYVINYL CHLORIDE)

1 part of the preparation according to Example 1(a) is worked into a dough with 3 parts of dioctyl phthalate and allowed to swell for 16 hours. It is then dispersed for 15 minutes by means of a gear disc.

The paste is mixed with 200 parts of a plastisol containing 57% of polyvinyl chloride, 38% of plasticiser and stabiliser and 5% of Titanium White, and applied. A perfectly homogeneously pigmented polyvinyl chloride coating is obtained.

Instead of the preparation according to Example 1(a), the preparations according to Examples 1(b), 1(c), 2(a), 2(b), 2(c) and 3 are used with equally good results.

EXAMPLE 9 (PRINTING INK)

10 parts of the preparation according to Example 1(a), 20 parts of chlorinated rubber (Parlon 55, Hercules), 10 parts of toluene and 60 parts of trichlorethylene are dispersed for 15 minutes by means of a gear disc stirrer. A vinyl resin-laminated aluminium foil is printed with the printing ink thus obtained. A very well-adhering uniformly coloured print is obtained.

What we claim is:

1. A process for making a pigment composition which comprises intimately mixing, in the substantial absence of water, a polyterpene resin of α-pinene, β-pinene, terpene-phenol or a copolymer of pinene and a vinyl monomer, with a pigment in the presence of a water-soluble solvent and thereafter adding water to precipitate the mixture and recovering the product which, after drying, contains from 20 to 90% by weight of pigment.

2. A process according to claim 1 in which the pigment, polyterpene resin and water-soluble solvent are kneaded together.

3. A method for pigmenting a thermoplastic resin, paint, lacquer, printing ink, melt spun fiber or solution spun fiber which comprises incorporating therein a pigment composition comprising from 20 to 90% by weight of pigment and a polyterpene resin dispersed therein.

References Cited

UNITED STATES PATENTS

| | | | |
|---|---|---|---|
| 2,649,382 | 8/1953 | Vesce | 260—41 |
| 3,353,974 | 11/1967 | Trimble et al. | 260—37 |
| 3,458,483 | 7/1969 | Dubsky et al. | 260—93.3 |
| 3,470,145 | 9/1969 | Lipman | 260—93.3 |

OTHER REFERENCES

Handbook of Material Trade Names, IV supplement, Zimmerman & Lavine, 1965, p. 223 relied on.

Encyclopedia of Chemical Technology, Kirk-Othmer, vol. 13, pp. 700–704 relied on, 1963.

U.S. Cl. X.R.

260—4 R, 17 R, 22 CB, 850, 857 R, 859 R, 873, 888, 896, 897 A